United States Patent [19]

Seegert et al.

[11] Patent Number: 5,381,648
[45] Date of Patent: Jan. 17, 1995

[54] MOWER DECK HEIGHT ADJUSTMENT MECHANISM

[75] Inventors: Brian D. Seegert, Hartford; Daniel A. Sebben, West Bend; Richard D. Teal, Horicon, all of Wis.

[73] Assignee: Deere & Company, Moline, Ill.

[21] Appl. No.: 68,829

[22] Filed: May 28, 1993

[51] Int. Cl.6 .............................................. A01D 34/74
[52] U.S. Cl. ...................................... 56/17.1; 56/15.9
[58] Field of Search ................. 56/14.7, 14.9, 15.1, 56/15.2, 15.6, 15.8, 17.1, 17.2, 208, 210, 15.9, 16.2

[56] References Cited

U.S. PATENT DOCUMENTS

| | | | |
|---|---|---|---|
| 3,512,344 | 5/1970 | Kortum | 56/25.4 |
| 3,706,188 | 12/1972 | Quiram | 56/11.6 |
| 4,006,580 | 2/1977 | Kalleicher | 56/17.2 |
| 4,120,136 | 10/1978 | Rose | 56/17.1 |
| 4,551,967 | 11/1985 | Murcko | 56/17.1 X |
| 4,577,455 | 3/1986 | Amano et al. | 56/17.1 |
| 4,733,522 | 3/1988 | Johansson | 56/17.4 |
| 4,869,057 | 9/1989 | Seigrist | 56/15.9 |
| 4,882,898 | 11/1989 | Samejima et al. | 56/208 |
| 5,142,850 | 9/1993 | Patterson et al. | 56/17.1 |
| 5,187,925 | 2/1993 | Patterson et al. | 56/17.1 |

FOREIGN PATENT DOCUMENTS

| | | | |
|---|---|---|---|
| 0144214 | 11/1984 | European Pat. Off. | A01D 34/74 |
| 0217772 | 9/1986 | European Pat. Off. | A01D 34/64 |
| 2374835 | 12/1977 | France | A01B 59/044 |
| 2117665 | 4/1970 | Germany | A01D 35/00 |

OTHER PUBLICATIONS

Parts Catalog published by John Deere Horicon Works in Aug. 1990 entitled "STX30 and STX38 Lawn Tractors", pp. 85-2 and 85-3.
Parts Catalog published by John Deere Horicon Works in Sep. 1990 entitled "GX70 and GX75 Riders", p. 85-1.
Parts Catalog published by John Deere Horicon Works in Oct. 1988 entitled "170, 175, 180 and 185 Lawn Tractors", pp. 85-2 and 85-3.
Parts Catalog published by John Deere Horicon Works in Sep. 1990 entitled "LX172, LX176, LX178 and LX186 Lawn Tractors", pp. 85-12 and 85-13.
Parts Catalog published by John Deere Horicon Works in Jan. 1989 entitled "RX63, RX73, RX75, SX75, RX95, SX95 Riding Mowers," pp. 85-1, 85-2 and 80-6.
Portions of a "Preliminary Feasibility Study" containing information generated and provided by employees of The Dow Chemical Co. and John Deere & Co., pp. 1-205 (see particularly pp. 30c and 63, co-generated prior to 1 Sep. 1989 and confidentiality shared between Dow and Deere in the U.S..

Primary Examiner—Ramon S. Britts
Assistant Examiner—James A. Lisehora

[57] ABSTRACT

A lift mechanism for adjusting the height of a mower deck includes a pivotable lift handle, a toothed member carried by the vehicle, and a rod-like member pivotally carried by the lift handle. A first portion of the rod engages the toothed member for maintaining the lift handle and mower deck at selected positions. A second portion of the rod radially offset from the first portion defines the axis about which the rod pivots during operation. First and second arcuate slots receive the first and second portions of the rod. The arc of the first slot has its center at a first position within the second slot, and the arc of the second slot has its center at a first position within the first slot. A blocking member carried by the lift handle is abuttable with the rod for preventing the first portion from pivoting to the first position whereat the second portion can pivot out of the second slot.

18 Claims, 5 Drawing Sheets

MOWER DECK HEIGHT ADJUSTMENT MECHANISM

BACKGROUND OF THE INVENTION

This invention relates to height adjustment mechanisms for mower decks.

Conventional mower deck height adjustment mechanisms typically provide a lever mechanism which is coupled to a mower deck via a series of linkages. A locking or latching mechanism is typically provided for securing the lever and mower deck in the desired position. Some height adjustment mechanisms also include lift assist mechanisms which help the operator lift the lever and mower deck to a higher position. Many conventional height adjustment mechanisms have been designed and manufactured to be sturdy and durable to withstand the wear of many repeated uses. However, conventional height adjustment mechanisms which are well designed for sturdiness and durability tend to be relatively costly to manufacture and assemble due to their rugged construction and high number of parts.

Therefore it would be desirable to provide a mower deck height adjustment mechanism which is sturdy and durable, but that includes a relatively small number of parts and is designed so that manufacturing and assembly costs are relatively low. It would also be desirable for such a height adjustment mechanism to be operable by only a single right or left hand of an operator, and to also be graspable by both of the operator's hands to thereby allow easy two-handed lifting.

SUMMARY OF THE INVENTION

The preferred embodiment of the present invention provides a lift mechanism for adjusting the height of a mower deck, and includes a pivotable U-shaped lift handle, a toothed member carried by the vehicle, and a rod-like member pivotally carried by the lift handle. The end portions or first portions of the rod engage the toothed member for maintaining the lift handle and mower deck at selected positions. A second portion of the rod defines the axis about which the rod pivots during operation. A centrally located offset portion of the rod is engagable by the operator for pivoting the rod-like member to disengage the first portion of the rod from the toothed member. First and second arcuate slots defined in the legs of the lift handle receive the respective first and second portions of the rod. The arc of the first slot has its center at a first position within the second slot, and the arc of the second slot has its center at a first position within the first slot. Therefore, to assemble the mechanism, the end portions of the rod are placed within the first positions of the first slots, and then the second portions of the rod are pivoted rearwardly within the second slots to the second slots' first positions. The end portions of the rod are then pivoted rearwardly within the first slots for engagement with the toothed member. A blocking means is then coupled with the handle for abutting or blocking the offset portion of the rod as the operator depresses the offset portion, thereby preventing the end portions of the rod from pivoting to the first position. The end portions must be located in the first position of the first slot in order for the second portions to pivot out of the second slot. Therefore, since the blocking means prevents the end portions of the rod from assuming the first position within the first slot, the second portion of the rod can not pivot out of the second slot. The rod is thereby securely captured within the slots without requiring further attachment mechanisms.

BRIEF DESCRIPTION OF THE DRAWINGS

In FIG. 3 the plastic handle grip is not shown installed on the lift handle.

DESCRIPTION OF THE PREFERRED EMBODIMENT

Figure 1:
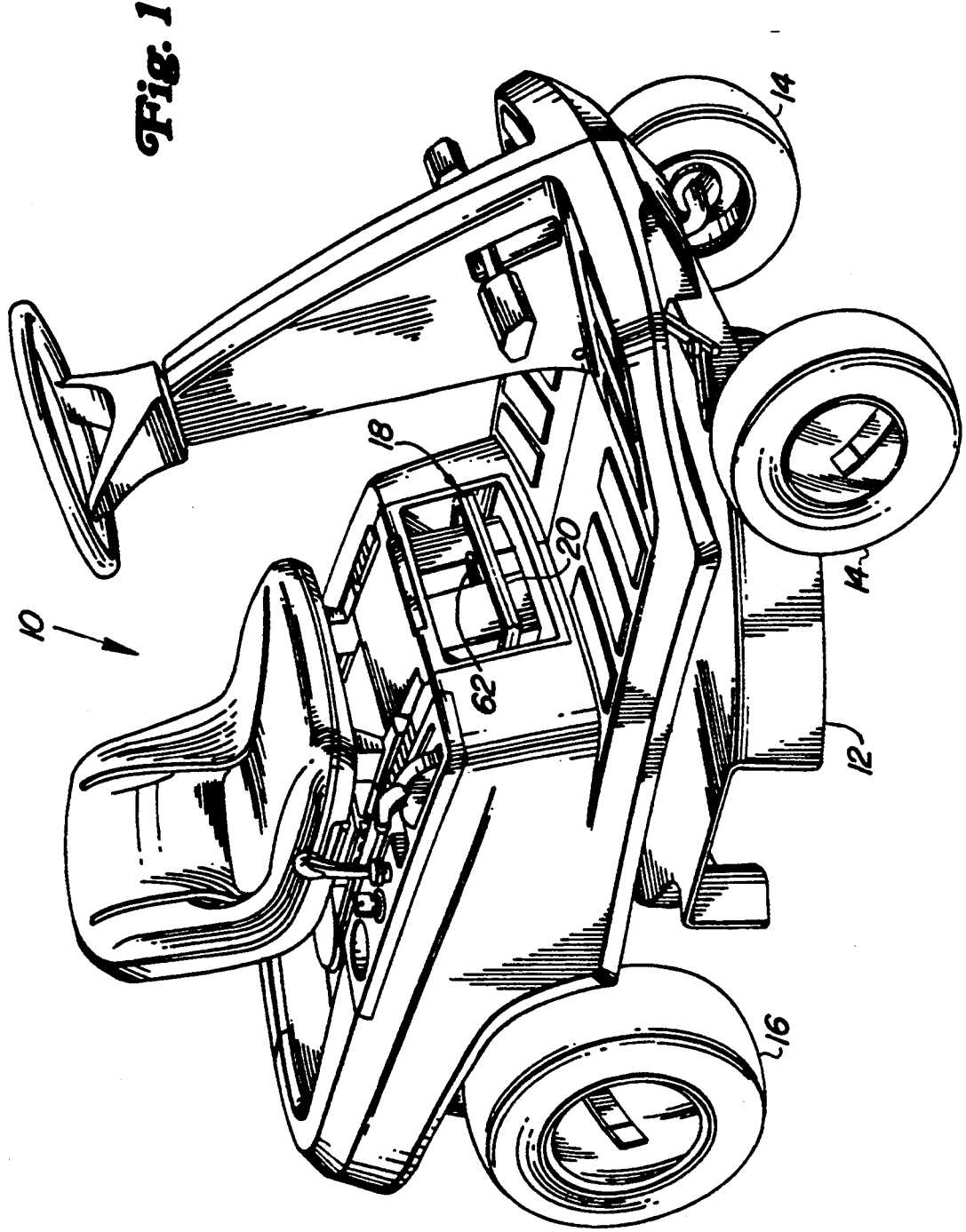
FIG. 1 illustrates a lawn mowing vehicle which includes the mower deck height adjustment mechanism according to the preferred embodiment of the present invention.

Referring now to FIG. 1, there is shown a vehicle 10 having a mower deck 12 mounted between the vehicle's front and rear wheels 14 and 16. A cutting blade rotates within the mower deck 12 to cut vegetation such as grass. The height of the cutting blade and mower deck 12 above the ground determines the height at which the grass is cut. A height adjustment mechanism 18 is carried by the vehicle 10 and allows the operator to selectively alter the vertical position of the mower deck 12.

Figure 2:
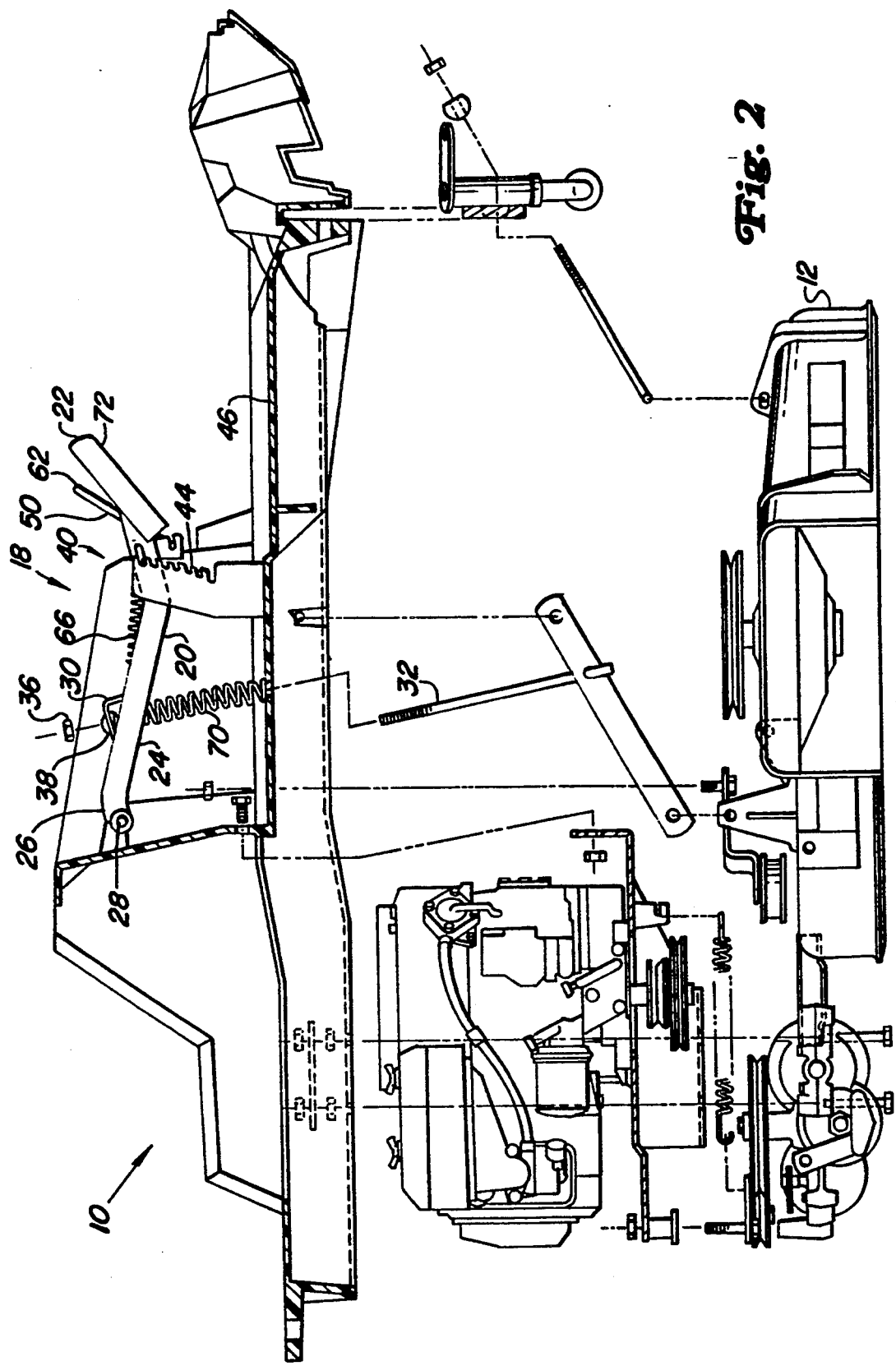
FIG. 2 is an exploded partial view of a vehicle having the mower deck height adjustment mechanism according to the preferred embodiment of the present invention.
Figure 3:
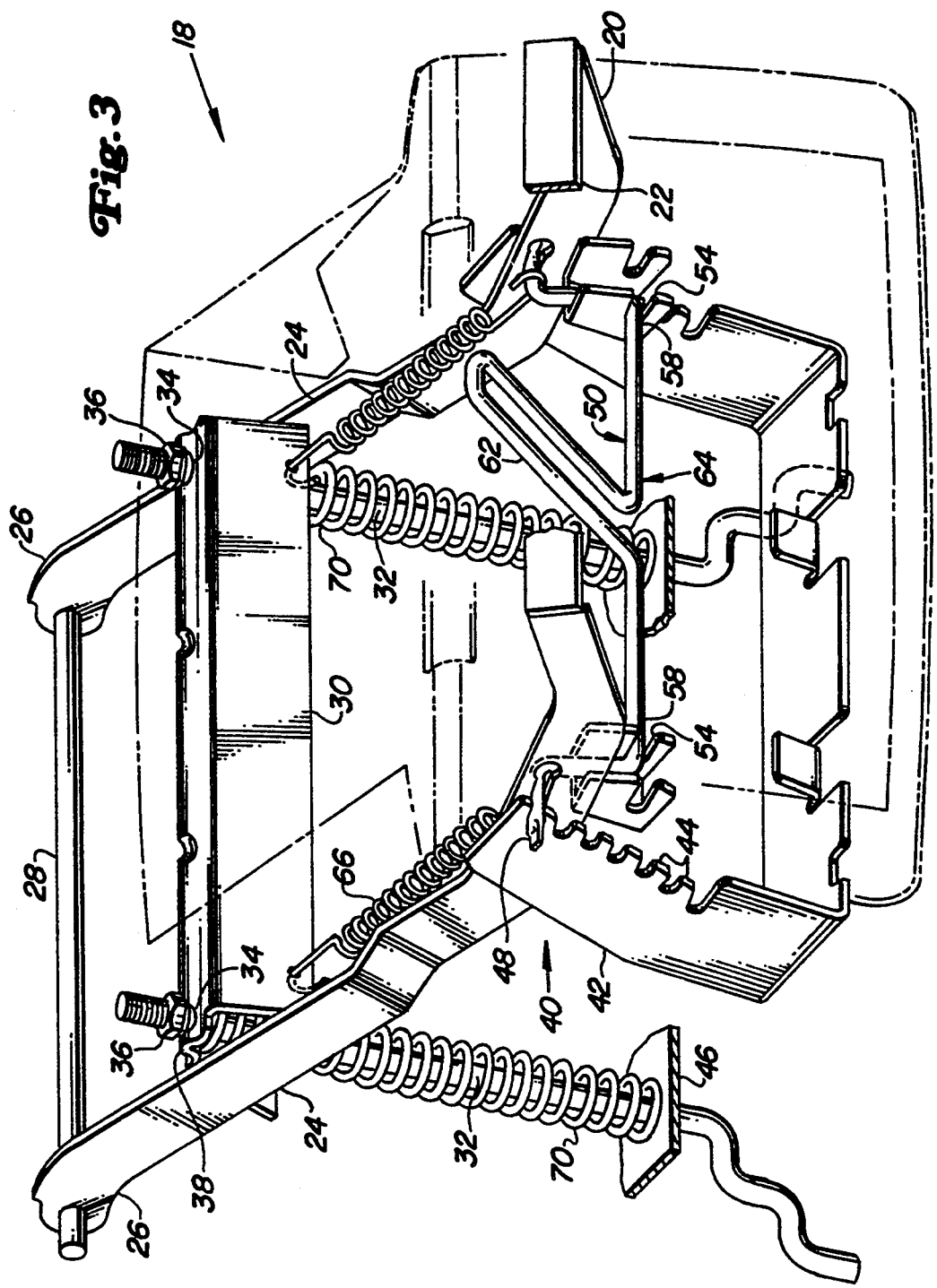
FIG. 3 is a perspective partial view of the lift mechanism according to the preferred embodiment.
Figure 4:
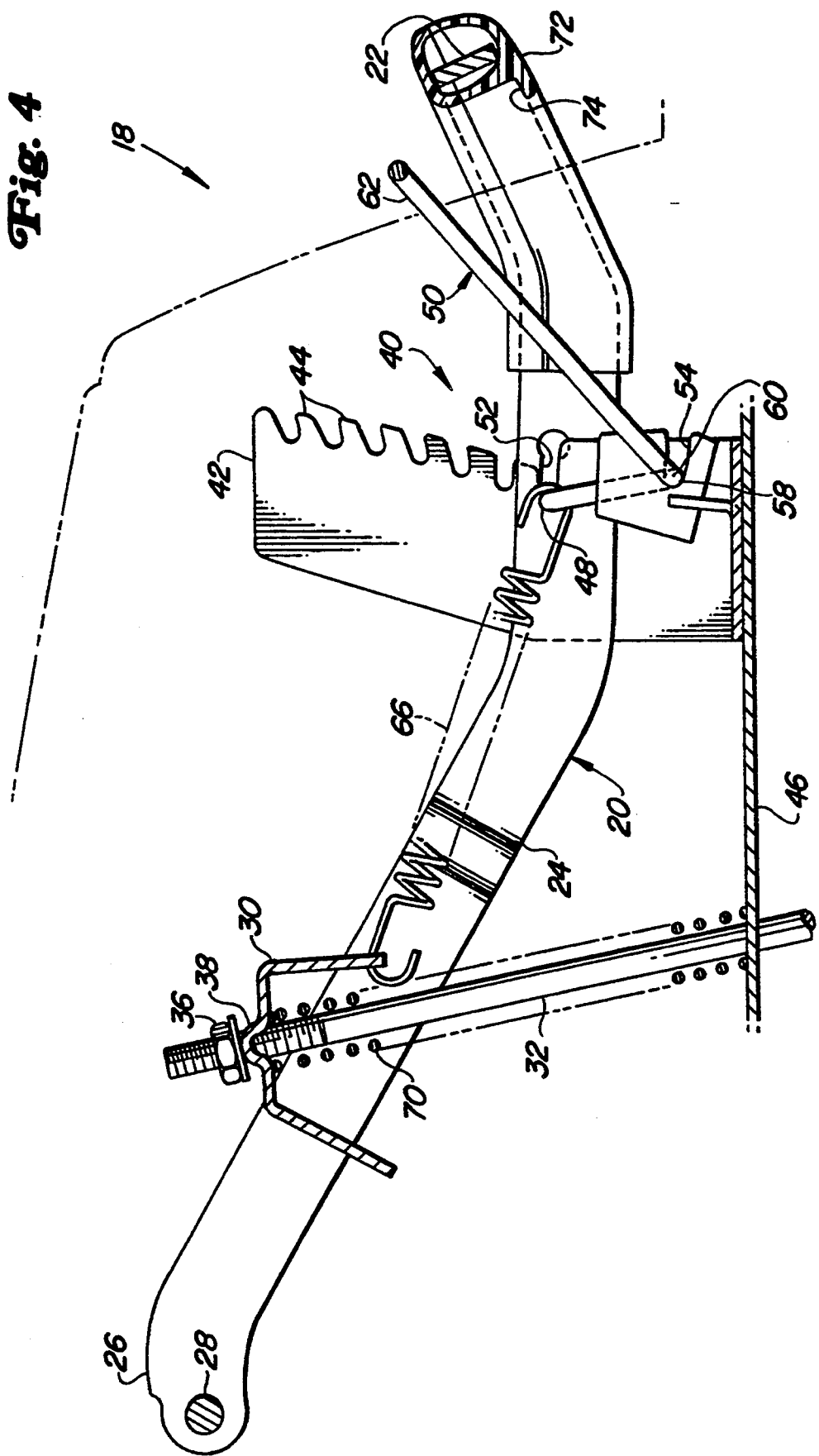
FIG. 4 is a side view of the mower deck lift mechanism in its operating configuration.

Referring now to FIGS. 2, 3 and 4, the height adjustment mechanism 18 of the preferred embodiment includes a lift handle 20 which is generally U-shaped. The lift handle 20 includes a laterally extending central portion 22 engagable by the operator's hands, and rearwardly extending opposite leg portions 24. The rear end portions 26 of the legs 26 of the U-shaped lift handle 20 receive a cross bar or cross rod 28 which is pivotally supported by the vehicle 10. The cross bar 28 defines the axis about which the lift handle 20 pivots during height adjustment operation. A cross beam 30 extends between the opposite legs 24 of the U-shaped lift handle 20. The cross beam 30 defines openings 34 through which lift rods 32 are received. Nuts 36 threaded onto the upper ends of the lift rods 32 operatively abut the cross beam 30. The lift rods 32 extend downwardly from the cross beam 30 and have lower end portions operatively coupled with the mower deck 12. As the operator pivots the lift handle 20 up or down about the cross bar 28, the motion is transferred to the mower deck 12 via the cross beam 30 and lift rods 32 to thereby adjust the height of the mower deck 12.

The lift rods 32 are allowed to pivot with respect to the cross beam 30, such as during height adjustment operation or during slight fore and aft swaying and shifting of the mower deck 12 when operating over bumpy or rough terrain. The openings 34 are formed in a rounded portion 38 of the cross beam. The rounded portion 38 abuts the flat underside of the nut 36 regardless of the particular fore and aft angle of the lift rod 32 with respect to the lift handle 20. The rounded portion 38 therefore generally prevents the corner of the nut 36 from bearing the load of the mower deck 12 when the lift rod 32 pivots with respect to the lift handle 20. The weight of the mower deck 12 is therefore properly transferred through the lift rod 32 and nut 36 to the cross beam 30 such that damage to the linkage is generally avoided.

As best seen in FIG. 3, a locking or latching mechanism 40 for allowing the mower deck 12 to be held securely in a selected position is also provided by the preferred embodiment of the present invention. A U-shaped toothed member 42 having a pair of generally vertically extending columns of teeth 44 is coupled with the frame 46 of the vehicle 10. The end portions 48 of a laterally extending pivot member or rod-like member 50 engage the teeth 44 for locking or latching the lift handle 20 in the desired position. The rod-like member 50 is received within first and second pairs of slots 52 and 54 formed in each leg 24 of the U-shaped lift handle 20. First portions or end portions 48 of the rod-like member 50 are shiftable within the first or upper slots 52 and are thereby guided into and out of engagement with the teeth 44 of the toothed member 42. The engagement of the end portions 48 of the rod-like member 50 against the toothed member 42 serves to secure the lift handle 20 in a selected position. The rod-like member 50 includes second portions 58 supported within the second or lower slots 54. During operation the second portions 58 are located within the end portions 60 of the lower slots 54 during operation and therein define the axis about which the rod-like member 50 pivots as the end portions 48 of the rod 50 shift into and out of engagement with the toothed member 42. An offset portion 62 formed in the central portion 64 of the rod-like member 50 is radially offset from the pivot axis of the rod-like member 50, and serves as a lever engagable by the operator for pivoting the rod-like member 50 and disengaging the end portions 48 from the toothed member 42. As the operator depresses the lever 62 the end portions 48 become disengaged from the toothed member 42 to allow the lift handle 20 to be lifted or lowered by the operator to a new position.

A first biasing means or tension spring 66 is coupled between the cross beam 30 and the end portions 48 of the rod 50 for urging the end portions 48 of the rod 50 to pivot to the latched position in engagement with the toothed member 42. The operator can simply release the offset portion 62 once he has positioned the lift handle 20 at a newly selected position and the biasing means 66 will pull the end portions 48 into engagement with the toothed member 42 for latching the height adjustment mechanism 18 at the selected location.

The lift handle 20 includes a laterally extending central portion 22 which can be grasped by either or both of the operator's hands to shift the lift handle 20. The offset portion 62 is positioned near the center of the lift handle 20 such that an operator can depress the offset portion 62 with either or both thumbs. Therefore, an operator can operate the height adjustment mechanism 18 with either hand when one-handed operation is required. Furthermore, an operator can grasp the central portion 22 of the lift handle 20 with both hands, thereby making it easier to lift the mower deck 12 to a higher position.

The preferred embodiment also includes a lift assist feature. Each lift rod 32 is positioned generally within the coils of a compression spring or second biasing means 70. The compression spring 70 abuts and presses against the cross beam 30 and a portion of the vehicle frame 46. The force exerted by the compression spring 70 acts to bias or urge the lift handle 20 upwardly, thereby assisting the operator in lifting the handle 20 to a higher position. The teeth 44 of the latching mechanism 40 prevent or block the end portions 48 of the rod 50 from shifting up or down, thereby generally preventing the upward force exerted by the compression spring 70 from altering the cutting height of the mower deck 12 even during operation over bumpy or rough terrain.

A plastic handle grip 72 is coupled with the laterally extending central portion 64 of the lift handle 20, and affords a rounded and textured grip which the operator can easily grasp. The plastic handle grip 72 comprises two plastic pieces which snap together around the lift handle 20. The handle grip 72 includes a ledge or blocking means 74 against which the offset portion 62 of the rod-like member 50 will abut once the operator has pivoted the offset portion 62 sufficiently to disengage the end portions 48 from the teeth 44. The operator can sense the offset portion 62 bottoming out against the ledge means 74 and thereby senses when the latching mechanism 40 is disengaged. The ledge 74 therefore serves to generally enhance the "feel" of the height adjustment mechanism 18. Also, since the ledge means 74 provides a positive end stop against which the offset portion 62 abuts when depressed by the operator, the ledge 74 prevents the operator from pivoting the rod-like member 50 to the point of bending the rod 50. Damage to the mechanism is thereby avoided.

Figure 5:
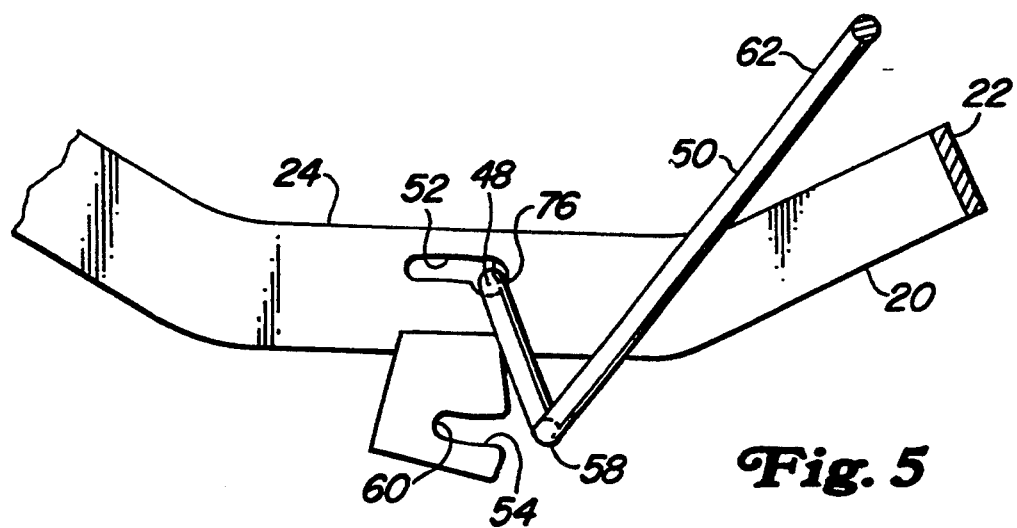
FIG. 5 is a partial side view of the mechanism with the end portions of the rod-like member inserted into the first positions of the upper slots of the lift handle during assembly of the mechanism.
Figure 6:
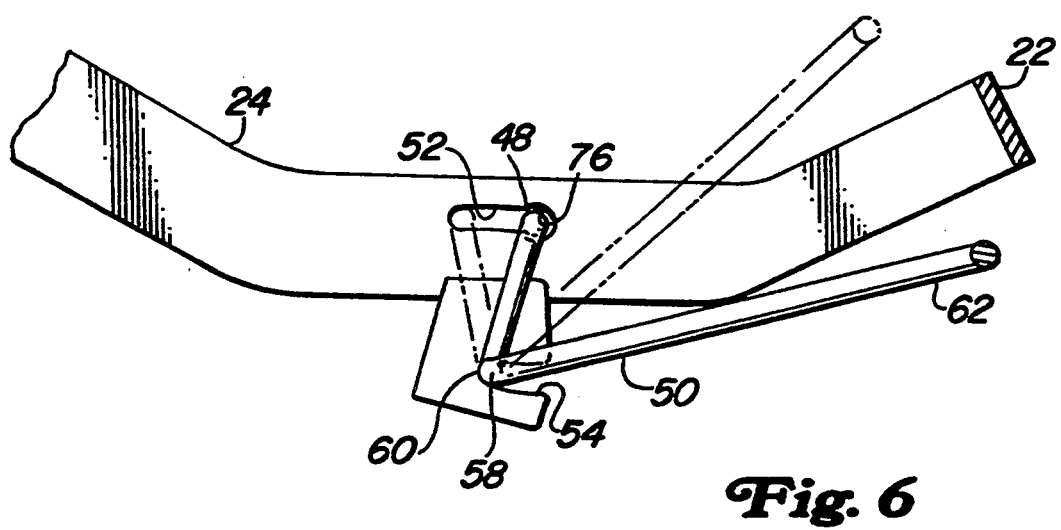
FIG. 6 is a partial side view of the mechanism with the second portions of the rod-like member located in the end portions of the lower slots of the lift handle during assembly of the mechanism.

Next, the assembly of the preferred embodiment will be discussed. To assemble the latching mechanism 40, the end portions 48 are fed into the first positions 76 of the upper slots 52 as shown in FIG. 5. The first position 76 of the upper slot 52 is the center of the arc of the lower slot 54. Therefore, with the end portions 48 held in the first portion 76 of the upper slots 52, the offset portion 62 of the rod-like member 50 is then pivoted downwardly so that the second portions 58 of the rod-like members 50 pivot into the lower slots 54 to the position shown in FIG. 6. As the second portions 58 shift rearwardly within the lower slots 54, the offset portion 62 has enough clearance to pass near to but not be blocked by the central portion 22 of the lift handle 20, since the plastic handle grip 72 having the ledge means 74 has not yet been installed on the central portion 22. The back end portion 60 of the lower slot 54 is the center of the arc of the upper slot 52, and therefore, once the second portion 58 has shifted to the back end portion 60 of the lower slot 54, the rod 50 can be pivoted such that the end portions 48 of the rod 50 pivot rearwardly within the upper slots 52 to the position shown in FIG. 4. The tension springs 66 can then be coupled with the end portions 48 of the rod 50 for biasing the rod 50 rearwardly into abutment with the toothed member 42. The rod 50 is now in an extreme upward and rearward position with respect to the lift handle 20, and the offset portion 62 of the rod 50 is positioned generally above the central portion 68 of the lift handle 20.

Next, the handle grip 72 is attached to the central portion 22 of the lift handle 20. Once installed, the blocking portion 74 of the handle grip 72 eliminates the clearance that allowed the offset portion 62 to pass by the central portion 22 of the lift handle 20. The offset portion 62 of the rod 50 will abut the blocking portion 74 when the offset portion 62 is depressed by the operator, thereby preventing the offset portion 62 of the rod 50 from pivoting forwardly and downwardly to the position whereat the end portions 48 of the rod 50 are located in the first positions 76 of the upper slots 52. Since the first positions 76 of the upper slots 52 are the centers of the arcs of respective lower slots 54, the second portions 58 of the rod 50 are blocked or prevented from pivoting along or out of the lower slots 54 when the end portions 48 of the rod 50 are not in the first position 76 of the upper slots 52. The upper and lower slots 52 and 54 and the ledge means 74 therefore act to capture the rod 50 in its operating position, as shown in FIG. 4, without requiring the use of other attaching structures which would add to the cost and complexity of the mechanism.

As described above, the upper and lower slots 52 and 54 extend in arcs having different centers of radii. Therefore, the second portion 58 of the rod 50 is blocked from shifting within the lower slot 54 when the end portion 48 of the rod 50 is not located at the upper slot's first position 76, which is the center of the arc of the lower slot 54. And since the blocking means 74 of the plastic handle grip 72 prevents the end portion 48 from pivoting to the first position 76, the rod 50 is effectively captured within the slots 52 and 54 without requiring a more complicated attaching mechanism having many parts. The present invention therefore provides a relatively durable height adjustment mechanism having relatively few parts and which is relatively simple to assemble.

To disassemble the mechanism and remove the rod 50 from the slots 52 and 54, the plastic grip 72 and blocking means 74 must be removed in order to provide clearance for the offset portion 62 to shift further downwardly. With the blocking means 74 removed, the end portions 48 of the rod 50 can pivot to the first position 76 within the upper slots 52. With the end portions 48 in the first positions 76 of the upper slots 52, the second portions 58 can be pivoted forwardly out of the lower slots 54. The rod 50 can then be removed from the upper slots 52.

I claim:

1. A mechanism adapted for releasably latching a lever means in a selected position, comprising:
   a lever means having first and second slots, said first slot extending in an arc circumscribing a first slot center, said first slot center being located at a first position within the second slot, said second slot extending in an arc circumscribing a second slot center, said second slot center being located at a first position within the first slot, said second slot also having an open end portion,
   a pivot member having first and second portions radially offset from one another, said first and second position being received within the respective first and second slots, said pivot member having an offset portion engagable by an operator for pivoting the pivot member about its second portion, said offset portion being radially offset from the second portion of the pivot member,
   a locking member engagable by the first portion of the pivot member for securing the lever means in a selected position, and
   a blocking member coupled with the lever means and abuttable with the pivot member preventing the first portion of the pivot member from pivoting to the first position within the first slot during operation.

2. The invention of claim 1, wherein the blocking member is removable for allowing the first portion of the pivot member to pivot to the first position within the first slot for allowing the second portion to pivot along the second slot and out the open end portion.

3. The invention of claim 1, wherein the pivot member is a rod-like member.

4. The invention of claim 1, wherein the latching mechanism is carried by a powered vehicle and is engagable by an operator for adjusting the height of a mower deck carried by the vehicle.

5. A lift mechanism adapted for use on a vehicle for adjusting the height of a mower deck, comprising:
   a lift handle having opposite legs and carried by the vehicle and coupled with the mower deck for adjusting the height of the mower deck as the operator shifts the lift handle,
   a toothed member carried by the vehicle, and
   a rod-like member extending generally transversely with respect to the vehicle and being pivotally carried by the lift handle for pivoting with respect to the lift handle about a generally transverse axis, said rod-like member having a first portion engagable with the toothed member for maintaining the lift handle and mower deck at particular positions, said rod-like member having an offset portion extending outwardly from said transverse axis and engagable by the operator for pivoting the rod-like member about said transverse axis for disengaging the first portion of the rod-like member from the toothed member, said rod-like member extending between and being supported by the opposite legs of the lift handle,
   a second portion of the rod-like member radially offset from the first portion, said second portion defining the transverse axis about which the rod-like member pivots during operation to shift the first portion into and out of engagement with the toothed member,
   said lift handle includes a first slot being adapted for slidably receiving the first portion of the rod-like member,
   said lift handle also includes a second slot extending in an arc and defined by the lift handle for receiving the second portion of the rod-like member, said second slot extending in an arc about a second slot center located at a first position within the first slot such that said second slot only when the first portion of the rod-like member is located in the first position within the first slot, said second slot having a first position located at the first slot center such that said first portion of the rod-like member is shiftable within the first slot only when the second portion of the rod-like member is in the first position within the second slot, and
   a blocking member for abutting the rod-like member and generally preventing the first portion of the rod-like member from pivoting to the first position with the first slot.

6. The invention of claim 5, wherein said blocking member is removable for allowing said rod-like member to pivot to a position whereat said first portion is located in the first position of the first slot.

7. The invention of claim 5, wherein said first portion of the rod-like member is insertable into the first position of the first slot such that the second portion can be pivoted to the first position within the second slot, said first portion of the rod-like member being shiftable within the first slot and away from the first position once the second portion is in said first position of the second slot.

8. The invention of claim 5, wherein the offset portion abuts against the blocking member when the operator pivots the rod-like member to disengage the first portion from the toothed member.

9. The invention of claim 5, and further comprising a first spring for biasing the rod-like member to pivot into engagement with the toothed member.

10. The invention of claim 5, and further comprising a second spring for biasing the lift handle to shift upwardly.

11. The invention of claim 10, and further comprising a connection member extending between the lift arm and the mower deck, and wherein said second spring is a compression spring which is positioned between and presses against the lift arm and a portion of the vehicle frame, the connection member being positioned within the compression spring during operation.

12. The invention of claim 5, wherein the blocking member is defined by a portion of a plastic handle grip fixed to the lift handle.

13. A lift mechanism adapted for use on a vehicle for adjusting the height of a mower deck, comprising:
 a lift handle being carried by the vehicle and coupled with the mower deck for adjusting the height of the mower deck as the operator shifts the lift handle, said lift handle having opposite legs,
 a toothed member carried by the vehicle,
 a rod-like member extending between and being supported by the opposite legs of the lift handle for pivoting with respect to the lift handle about a generally transverse axis, said rod-like member having:
  a first portion engagable with the toothed member for maintaining the lift handle and mower deck at particular positions,
  a second portion of the rod-like member radially offset from the first portion, said second portion defining the transverse axis about which the rod-like member pivots during operation to shift the first portion into and out of engagement with the toothed member,
  an offset portion positioned radially outwardly from said transverse axis and engagable by the operator for pivoting the rod-like member about said transverse axis for disengaging the first portion of the rod-like member from the toothed member,
 two pairs of first and second arcuate slots, one pair of first and second slots being formed in each leg of the lift handle for slidably receiving respective first and second portions of the rod-like member, said second slot extending in an arc about a second slot center located at a first position within the first slot such that said second portion of the rod-like member is shiftable within the second slot only when the first portion of the rod-like member is located in the first position of the first slot, said first slot extending in an arc about a first slot center located at a first position within the second slot such that said first portion of the rod-like member is shiftable within the first slot only when the second portion of the rod-like member is in the first position within the second slot, and
 a blocking member for abutting the offset portion of the rod-like member when the operator pivots the rod-like member to disengage the first portion from the toothed member for thereby generally preventing the first portion of the rod-like member from pivoting to the first position within the first slot, said blocking member being removable for allowing said rod-like member to pivot to a position whereat said first portion is located in the first position of the first slot.

14. The invention of claim 13, wherein said first portion of the rod-like member is insertable into the first position of the first slot such that the second portion can be pivoted to the first position within the second slot, said first portion of the rod-like member being shiftable within the first slot and away from the first position once the second portion is in said first position of the second slot.

15. The invention of claim 13, and further comprising a first biasing means for biasing the rod-like member to pivot into engagement with the toothed member.

16. The invention of claim 13, and further comprising a second biasing means for biasing the lift handle to shift upwardly.

17. The invention of claim 16, and further comprising a connection member extending between the lift handle and the mower deck, and wherein said second biasing means is a compression spring which is positioned between and presses against the lift arm and a portion of the vehicle frame, the connection member being positioned within the compression spring during operation.

18. The invention of claim 13, wherein the blocking member is defined by a portion of a plastic handle grip fixed to the lift handle.

* * * * *

UNITED STATES PATENT AND TRADEMARK OFFICE
CERTIFICATE OF CORRECTION

PATENT NO. : 5,381,648
DATED : January 17, 1995
INVENTOR(S) : Brian David Seegert, et al.

It is certified that error appears in the above-indentified patent and that said Letters Patent is hereby corrected as shown below:

Column 6, line 43 after "slot" insert --extending in an arc about a first slot center, said first slot--.

Column 6, line 50, after "second" insert --portion of the rod-like member is shiftable within the second--

Signed and Sealed this

Eighteenth Day of July, 1995

BRUCE LEHMAN

Attest:

Attesting Officer

Commissioner of Patents and Trademarks